H. RYDER & L. C. WILSON.
COMPOSITION FOR PURIFYING AIR.
APPLICATION FILED NOV. 14, 1906.

907,180.

Patented Dec. 22, 1908.

WITNESSES:
Fred White
Rene Muine

INVENTORS:
Herbert Ryder and
Lyndon Charles Wilson,
by their Attorneys
Arthur C. Fraser & Uana

UNITED STATES PATENT OFFICE.

HERBERT RYDER AND LYNDON CHARLES WILSON, OF NEWARK-ON-TRENT, ENGLAND.

COMPOSITION FOR PURIFYING AIR.

No. 907,180.  Specification of Letters Patent.  Patented Dec. 22, 1908.

Application filed November 14, 1906. Serial No. 343,345.

*To all whom it may concern:*

Be it known that we, HERBERT RYDER, of Trent House, Newark-on-Trent, in the county of Nottingham, England, brewer, and LYNDON CHARLES WILSON, F. C. S., of 31 Castlegate, Newark-on-Trent aforesaid, analyst, have invented certain new and useful Improvements in and Relating to Compositions for Purifying Air, of which the following is a specification.

This invention relates to air purifiers and has for its object to provide an improved means for effecting the purification.

According to this invention the purifying means is composed of the following materials, viz:—calcium carbonate, glycerin, calcium chlorid, and potassium meta-bisulfite, $K_2S_2O_5$.

In use the purifying materials are preferably placed on trays in an air tight chamber, the trays being slid into position one above the other.

The following is an example of the method of carrying the invention into effect. The calcium carbonate, glycerin and meta-bisulfite ($K_2S_2O_5$) are placed together in one or more of the trays and the calcium chlorid is placed separately in one or more of the remaining trays, the arrangement of the trays of material constituting as a whole a medium whereby the air becomes purified. The proportions in which the material are preferably employed are as follows:—Glycerin 80%, calcium carbonate 2%, calcium chlorid 15% and potassium meta-bisulfite 3%. These proportions may, however, be varied according to the class of impurity in the air, for instance, in an atmosphere known to contain many lactic bacteria the proportion of potassium meta-bisulfite would be increased to (say) 10% the evolution of sulfurous acid being fatal to these bacteria. The proportion of calcium chlorid is correspondingly reduced. The calcium carbonate is employed as a convenient means for the purpose of stiffening the glycerin and preventing it from flowing.

When the apparatus is in operation the air enters at the top of the chamber and passes over the purifying medium on the trays which are arranged with openings at the opposite ends of alternate trays so that the air takes a zig-zag course over all the trays.

Referring now to the accompanying drawings, of which—

Figure 1:
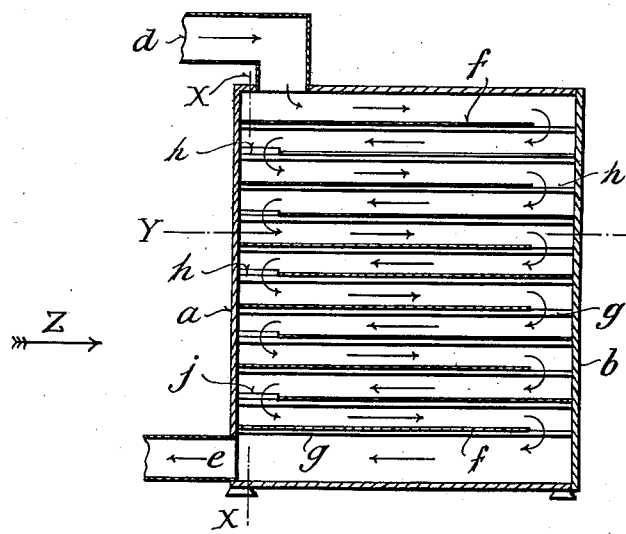
Figure 2:
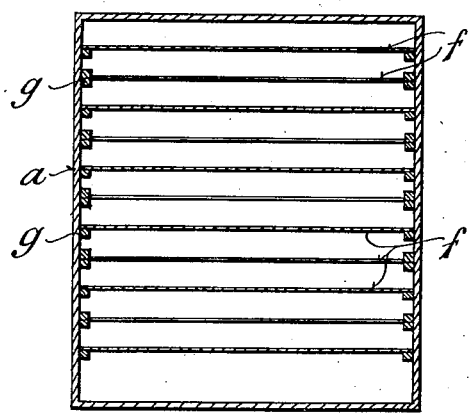
Figure 3:
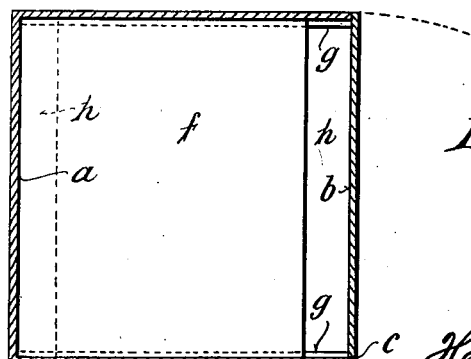

Figure 1 is a sectional elevation of one form of apparatus adapted for carrying out this invention and Fig. 2 is a sectional elevation on line X—X, Fig. 1 taken in the direction of the arrow Z and Fig. 3 is a sectional plan on line Y—Y Fig. 1.

*a* is a casing of any suitable material such as sheet iron, having an air tight door *b* hinged to the casing as at *c*, an air inlet *d*, and an air outlet *e*.

*f* . . . are a series of trays adapted to be slid into the casing *a* on runners *g* . . . , said trays being of less depth than that of the casing *a* and so disposed in said casing as to leave openings at the ends of the said trays, as at *h*, said openings being at alternate ends. *j* . . . are stops on the runners *g* . . . to prevent alternate trays from being pushed too far into the casing.

The air may be drawn or forced through the casing *a* by a fan or other suitable means.

It has been found that the calcium chlorid requires frequent renewal in order to efficiently absorb the moisture present in the air passing through the apparatus. This renewal is not always possible or convenient and the calcium chlorid may then be allowed to become saturated or non-effective; some of the moisture in the air being then taken up by the glycerin without detrimentally affecting the efficiency of the apparatus. By the use of purifying medium in accordance with this invention the air is efficiently purified and is well adapted for introduction to hospitals, breweries and other places where pure air is required. It is not essential in all cases to stiffen the glycerin, and the calcium carbonate may be omitted; but it is well to use the glycerin in a viscous state at the commencement of the operation.

What we claim and desire to secure by Letters Patent is:—

1. A composition for purifying air composed of glycerin, calcium carbonate and potassium meta-bisulfite in suitable proportions.

2. A composition for purifying air composed of glycerin and potassium meta-bisulfite.

In witness whereof, we have hereunto signed our names in the presence of two subscribing witnesses.

HERBERT RYDER.
LYNDON CHARLES WILSON.

Witnesses:
 HORACE BUNN,
 THOS. H. COOK.